United States Patent [19]

Schmider

[11] 4,366,405
[45] Dec. 28, 1982

[54] TACHOGENERATOR HAVING STRAY FLUX CANCELLING OUTPUT COILS

[75] Inventor: Fritz Schmider, Hornberg, Fed. Rep. of Germany

[73] Assignee: Papst Motoren KG, St. Georgen, Fed. Rep. of Germany

[21] Appl. No.: 180,110

[22] Filed: Aug. 21, 1980

[30] Foreign Application Priority Data

Aug. 23, 1979 [DE] Fed. Rep. of Germany ....... 2934085

[51] Int. Cl.$^3$ ...................... H02K 1/22; H02K 11/00; H02K 16/04
[52] U.S. Cl. ................................ 310/268; 310/68 R; 318/318; 324/174
[58] Field of Search ................. 310/268, 113, 15, 168, 310/169, 170, 75 R, 112, 114, 68 R, 68 B, 68 C, 186, 220–224; 324/173, 174, 241, 225, 208

[56] References Cited

U.S. PATENT DOCUMENTS

| | | | |
|---|---|---|---|
| 3,504,320 | 3/1970 | Engdahl et al. | 310/15 |
| 3,723,862 | 3/1973 | Wentzel et al. | 324/173 |
| 3,816,776 | 6/1974 | Chari | 310/15 |
| 3,967,200 | 6/1976 | Tetsugu et al. | 310/168 |
| 3,984,713 | 10/1976 | Presley | 310/168 |
| 4,045,738 | 8/1977 | Buzzell | 324/174 |
| 4,174,484 | 11/1979 | Schmider | 310/268 |
| 4,260,914 | 4/1981 | Hetrich | 310/15 |

FOREIGN PATENT DOCUMENTS 52-58574  5/1977  Japan .................. 324/174

Primary Examiner—J. D. Miller
Assistant Examiner—D. L. Rebsch
Attorney, Agent, or Firm—Frishauf, Holtz, Goodman & Woodward

[57] ABSTRACT

A tachogenerator mounted on the underside of a brushless d.c. motor having an external permanent magnet rotor 11 and ironless stator coils affixed to a return magnetic path plate has a first winding surrounded by a first magnetic circuit for producing an alternating voltage of a frequency dependent upon speed of rotation and a second winding for compensation of the effect of the alternating stray flux penetrating through the tachogenerator, the compensation being provided by superposing the output voltage of the second winding on the output voltage of the first winding. The second winding is arranged in a second magnetic circuit, such that upon revolution of the rotor, useful alternating flux is generated which is synchronous with that generated by the first magnetic circuit, but which is spatially in phase opposition thereto. A common rotor and a common source of magnetomotive force, such as a permanent magnet, are provided for both magnetic circuits, the magnet being an annular magnet with a large number of poles of alternating polarity, which cooperates with a toothed element of which the alternating recesses and projections are the same in number as the alternating poles of the magnet. The configuration is such that with relative movement, one part of the useful alternating magnetic flux generated flows around the winding of the first magnetic circuit in one sense, and another part of the same useful magnetic flux flows around the winding of the second magnetic circuit in the opposite sense. The ring magnet is preferably stationary and the toothed element is constituted by the outer portion of the rotor which revolves just inside the ring magnet. The second return path member carries at its center a bearing for the common shaft of the tachogenerator and the d.c. motor.

16 Claims, 4 Drawing Figures 4,366,405

TACHOGENERATOR HAVING STRAY FLUX CANCELLING OUTPUT COILS

This invention concerns a tachogenerator of the kind having a rotor by the rotation of which a first useful alternating flux is produced in a first winding surrounded by a first magnetic circuit, by which an alternating voltage of a frequency dependent upon speed of rotation is induced in that winding and having a second winding for compensation of the effect of the alternating stray flux penetrating through the tachogenerator, the output voltage of which second winding is superposed on the output voltage of the first winding.

Such a tachogenerator was disclosed in my U.S. Pat. No. 4,174,484, issued on Nov. 13, 1979, the full disclosure of which is hereby incorporated by reference to avoid unnecessary length in the present specification.

Heretofore known versions of tachogenerators of this kind leave much to be desired in the ratio of the disturbance signal produced by stray flux to the useful tachogenerator signal.

SUMMARY OF THE INVENTION

It is an object of the present invention to improve the ratio of useful signal to disturbance signal in a tachogenerator of the above-mentioned kind and to provide for that purpose an improved tachogenerator structure that is economical for manufacture.

Briefly, the second winding is arranged in a second magnetic circuit such that, upon revolution of the rotor, useful alternating flux is generated which is synchronous with that generated by the first magnetic circuit, but which is spatially in phase opposition thereto. It is particularly economical to incorporate this feature in a structure in which a common rotor and a common source of magnetomotive force, for example, a permanent magnet or an electromagnet, is provided for both magnetic circuits. The magnet is then provided as an annular magnet with a large number of poles of alternating polarity which cooperates with a toothed element of which the alternating recesses and projections are the same in number as the alternating poles of the magnet, these being relatively disposed so that with relative movement, one part of the useful alternating magetic flux generated thereby flows around the winding of the first magnetic circuit in one sense and another part of the same useful magnet flux flows around the winding of the second magnetic circuit in the opposite sense. Preferably the ring magnet is stationary and the toothed element is constituted by the outer portion of the rotor which revolves just inside the ring magnet, the latter being mounted on the radially inward side of the rim of a first magnetic return path member that has a radially inwardly extending section that completes the first magnetic circuit, surrounding the winding of that circuit except for a gap, preferably a thin one, between itself and the rotor, while on the other side of the rotor a second return path member is provided that similarly surrounds the winding of the second magnetic circuit.

The second return path member preferably carries at its center a bearing for the shaft on which is mounted the rotor of the tachogenerator and which preferably serves as the shaft of the motor the speed of which the tachogenerator serves to measure. Other significant features of the tachogenerator of the invention appear in the detailed description of an illustrated embodiment which are not to be regarded as limited to that specific embodiment.

BRIEF DESCRIPTION OF THE DRAWINGS

The invention is further described by way of illustrative example with reference to the annexed drawings, in which.

DESCRIPTION: AN ILLUSTRATIVE EMBODIMENT

Figure 1:
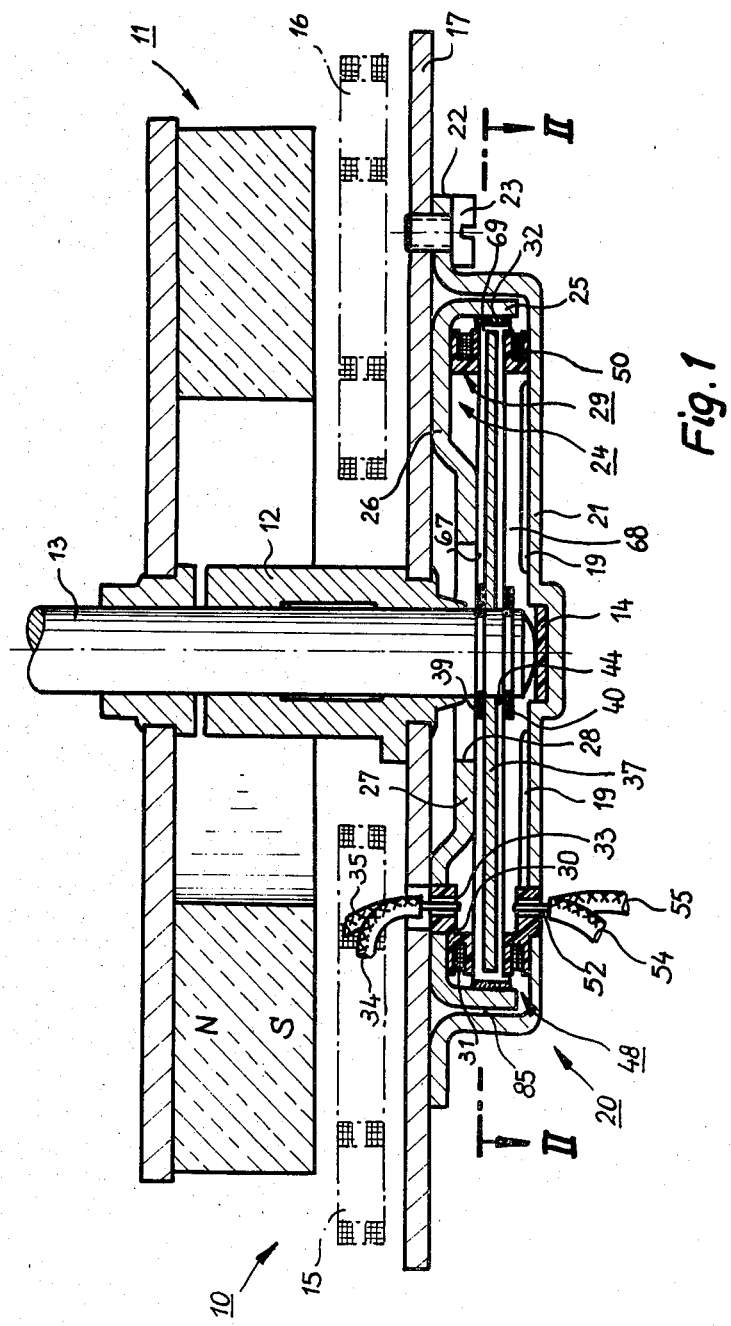
FIG. 1 is a cross section passing both through the axis of a flat air gap motor shown only schematically and through a tachogenerator according to the invention mounted on the underside of said motor.

FIG. 1 illustrates, highly schematically on a scale of about 2 to 1, a brushless dc motor 10 having a permanent magnet rotor 11, a shaft 13 mounted rotatively in a stator bushing 12 that is supported on a axial or thrust bearing 14, as well as quite schematically indicated ironless stator coils 15 and 16 that are affixed in a suitable way to a return magnetic path plate 17 made of soft iron or the like. The coils conduct pulsating currents, thereby producing an alternating stray field, during operation of the motor.

On the underside of the return magnetic path plate 17 is a tachogenerator 20 according to the invention, which here additionally has the function of holding the axial bearing 14 for the shaft 13 that serves both the motor and the tachogenerator.

The axial bearing 14 must be able to withstand quite high forces in such a motor, since the magnet of the rotor 11 is pulled towards the return path plate 17 with a force of several pounds.

A shell-like part 21 of a soft magnetic material, for example steel, provided with radial reinforcing ribs 19 serves to support the bearing 14. The part 21 is affixed on the underside of the return path plate 17 of the motor by means of its flange-like rim 22 and screws 23 of which only one is illustrated. The part 21 itself serves as a stationary return magnetic path member for the tachogenerator. A suitably shaped piece 24, likewise made of a magnetically soft material, is surrounded at a slight radial spacing (air gap 85) by the part 21 just described and is likewise affixed to the return magnetic path plate 17, for example, by adhesive, screws, rivets or welding and likewise serves as a stationary return magnetic path member. It has a downwardly extending rim 25 on the inside of which a thin annular magnet 32 is affixed by adhesive. The magnet 32 consists of an elastomeric material in which hard ferritic particles are embedded. Rim 25 merges radially inwards into a flat section 26 which, as already mentioned, is affixed to the return path plate 17 and also has on its radially inward side a downwardly drawn section 27 that also is essentially flat and is provided with an aperture 28 around the shaft 13. The section 27 thus forms a central depression of the formed piece 24.

Figure 2:
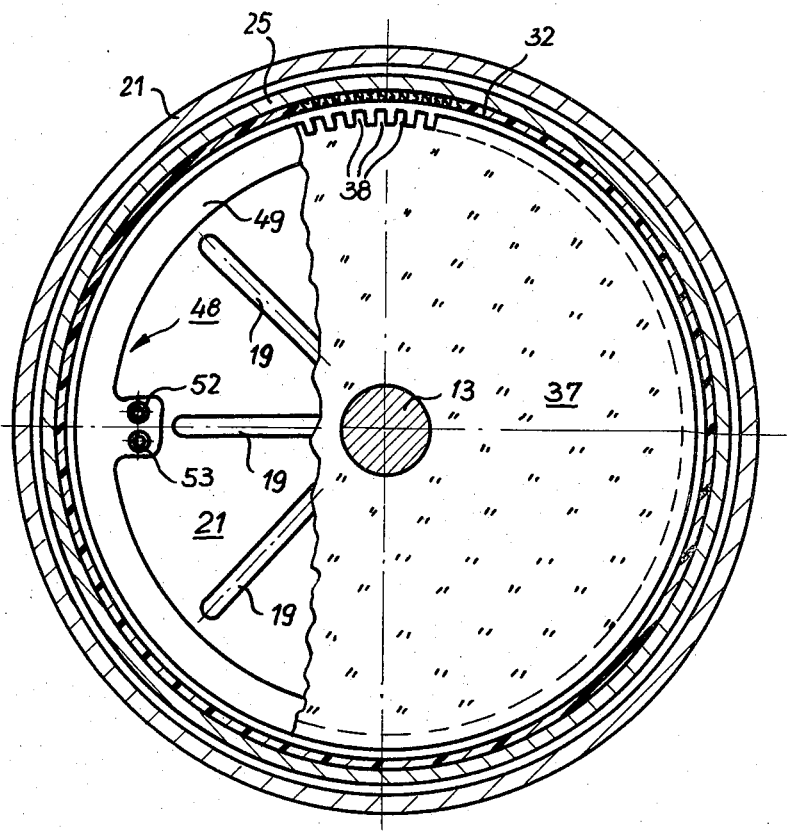
FIG. 2 is a section along the line II—II of FIG. 1.

In the region of the transition from the flat section 26 to the rim 25 is a first winding 29 in the form of a coil 31 wound on a synthetic resin spool 30. The spool 30 is provided with two solder eyes 33, of which only one is shown in FIG. 1, serving for a connection of the wire ends of the coil 31 with two connecting cables 34 and 35. Below the formed piece 24 a toothed disc 37, made of a magnetically soft material, is fixedly mounted on the shaft 13. As FIG. 2 shows, the disc 37 is provided with a multiplicity (e.g. 200) of fine teeth 38 by fine stamping or the like. The annular magnet 32 is, as shown, correspondingly provided with the same number of poles of alternating polarity, e.g. in the case of 200 teeth 38, thus 200 north poles and between these in each case 200 south poles (cf.FIG. 2). The teeth 38 thus can stand either opposite only north poles (see FIG. 2) or opposite only south poles, so that with a full revolution of the shaft 13 the flux through the teeth 38 reverses 400 times.

The toothed disk 37 can also be of composite form made of two identical stampings, as shown in FIG. 10 or FIG. 10A of my aforesaid prior U.S. Pat. No. 4,174,484. In such a structure, the two identical stampings are riveted together with a relative rotary displacement of 180° in order to provide reduction of subdivision errors. It has been found, however, that this precaution may be omitted in practice in most cases.

Two snap-ring clips 39 and 40 are held in corresponding ring grooves of the shaft 13 and hold the toothed disk 37 between them. Two cup srings are held between the lower spring clip 40 and the toothed disk 37 at 44 and press the disk 137 with locking friction against the spring-clip 39 so that the disk is carried along by the clip 39 as the shaft rotates. The disk 37, as shown in FIG. 1, thereby is positioned more or less in the midplane of the annular magnet 32. Small axial shifting of the toothed disk 37 upwards or downwards, as is evident, have no influence on the manner of operation of the tachogenerator 20, since the ring magnet 312 has a sufficient axial dimension to take care of that.

Figure 3:
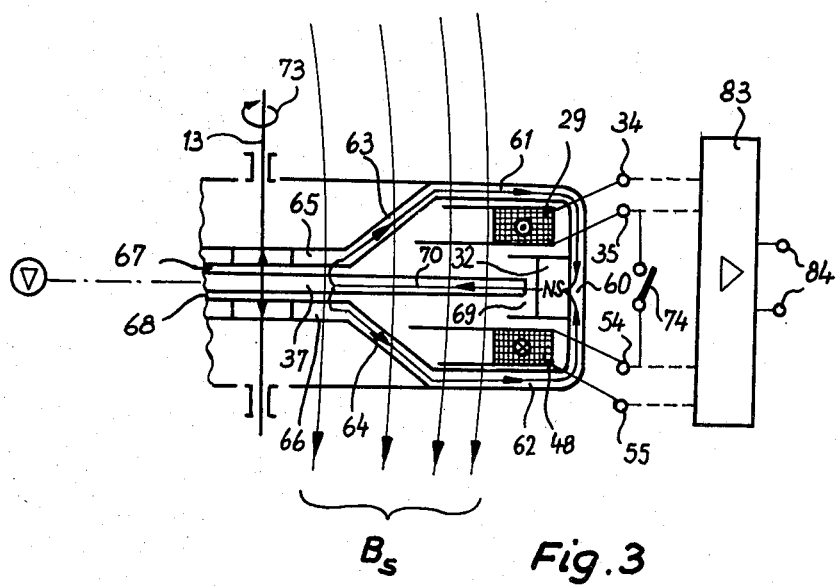
FIG. 3 is a schematic diagram for explanation of the invention.

Beneath the toothed disk 37 on the shell-like part 21 a second winding 48 is mounted that is identical in external configuration with the first winding 29 (i.e., here also the spool body is a plastic molding 49 on which a coil 50 is wound) in this case with a direction of winding opposite that of the first coil 31 (compare in this respect the normal representation of the winding sense in FIG. 3 by means of point and cross symbols. Here also the molding 49 is provided with two soldering eyes 52 and 53 that serve for connection of the wire ends of the coil 50 respectively to two connecting leads 54 and 55. As shown the two windings 29 and 48 are substantially identical, lie more or less symetrically to the toothed disc 37 and have magnetic circuits that are also to a great extent identical, as will be described below in further detail, so that they should have about the same number of turns. (The optimum turns ratio can deviate slightly form 1:1, to an extent that can be determined only by experiment for the particular case.)

In manufacture the set of components consisting of the parts 12, 17 and 24 are first mounted on a mandrel that fits fully in the stator bushing 12 and the ring magnet 32 is then so finished on a lathe that it is exactly concentric with the shaft 13. It is then magnetized in the manner described above and the first winding 29 is next glued into the piece 24. The shaft 13 is then introduced instead of the mandrel and the toothed disc 37 is mounted on it. Then the shell shaped part 21 with the second winding 48 affixed therein is fastened by screws 23 to the return path plate 17 of the motor, in which step the shaft 13 is then put onto its axial bearing. For disassembly the procedure is reversed in an analogous way.

OPERATION

Figure 4:
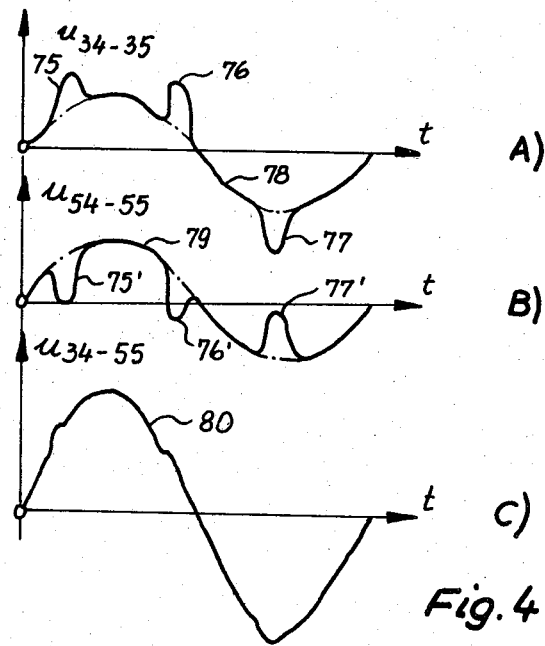
FIG. 4 is a graph showing the course of several curves on the same time axis for explanation of the invention.

FIGS. 3 and 4 are useful to to explain the manner of operation of the tachogenerator of FIGS. 1 and 2.

FIGS. 3 shows schematically the shaft 13, the toothed disc 37 and the magnetic circuits excited by the ring magnet 32 adhesively mounted in place (only one pole thereof being shown in this diagram).

The magnetic circuit is represented in symetrical form here for reasons of simplification, although this varies from FIG. 1. Thus the magnetic circuit as shown in FIG. 3, as a simplification, has an outer rim 60 that merges, above and below respectively, into horizontal sections 61 and 62. These sections then have further conical transition sections, respectively 63 and 64, leading to horizontal sections 65 and 66 that are separated from the toothed disc 37 only by narrow air gaps respectively shown at 67 and 68. The toothed disc 37 is separated from the ring magnet 32 by a radial air gap 69. In the position of the parts shown in FIG. 3 all of the teeth of the toothed disc 37—spaced exactly as in FIG. 2—lie opposite corresponding north poles, so that a magnetic flux 70 procedes out from the north pole across the radial gap 69 into the toothed disc 37. This magnetic flux divides; its first half flows up over the air gap 67, through the sections 63 and 61 and the rim 60 back to the ring magnet 32 and thus encircles the first winding 29 clockwise. The other half of the flux flows across the air gap 68, through the sections 64 and 62 and the rim 60 back to the ring magnet 32 and thereby encircles counterclockwise the second winding 48.

Since this magnetic flux continually changes during rotation of the disc 37 (arrow 73 in FIG. 3) it induces alternating voltages in the two identical windings 29 and 48 which, however, are opposed to each other because of the different directions of encirclement by the flux. Since the windings are likewise oppositely wound, voltages of the same polarity are induced by both windings, so that when the windings are connected in series, which is to say when the switch 74 of FIG. 3 is closed, a combined voltage is obtained between the terminals 34 and 55 which is twice as great as the individual voltages respectively across the windings 29 and 48.

FIG. 3 further shows, in addition, an alternating stray flux $B_s$ which in operation is produced by the stator coils 15 and 16 or by a power transformer, not shown in the drawing, and induces disturbing voltages in the windings 29 and 48, as is most undesired, since that can unfavorably affect a motor speed control and thereby the uniformity of rotation of the motor.

In the case of a tachogenerator according to the invention, however, these disturbing voltages have practically no effect, since as shown the windings 29 and 48 are wound in opposite senses so that opposed disturbing voltages are induced in them by the stray flux $B_s$, which substantially eliminate each other in the case of a series connection or some other kind of superposition.

The above described result is illustrated in FIG. 4. On the axis A is plotted the voltage which is induced in operation between the terminals 34 and 35 of the first winding 29, which is in this case a sinusoidal voltage 78 on which are superposed voltage humps 75, 76 and 77 as the result of the alternating stray flux $B_s$ (FIG. 3).

On the horizontal axis B of FIG. 4 the voltage between the terminals 54 and 55 of the second winding 48 is plotted, which is a sinusoidal voltage 79 that is identical with the sinusoidal voltage 78, on which, however, as a result of the alternating stray flux $B_s$ voltage depressions 75', 76' and 77' are superposed, which—on account of the opposite sense of winding of the two windings 29 and 48—here have opposite polarity relative to the humps 75, 76 and 77, but the same phase position.

If the switch 74 of FIG. 3 is closed, there is obtained between the terminals 34 and 55 the sinusoidal voltage 80 plotted on the axis C of FIG. 4, which has twice the amplitude of either of the individual sinusoidal voltages 78 and 79 and in which the humps 75-77 and the depressions 75'-77' have practically eliminated or cancelled each other.

In comparison to the arrangement shown in my aforesaid U.S. Pat. No. 4,174,484, the ratio of useful voltage (sinusoidal voltage 80 on axis C of FIG. 4) to disturbing voltage (residual disturbing voltage appearing on the plot on the same axis C of FIG. 4) is practically doubled, and this without additional expense.

In the case of particularly high requirements on freedom from disturbance of the output voltage, an electronic superposition circuit 83 can be utilized as shown in FIG. 3, to which the respective output voltages of the two windings 29 and 48 are separately supplied and there superposed, with optimizing weighting. The weighting can be carried out empirically in such a manner that for the particular apparatus, for example a magnetic tape sound reproducer or a turntable, the optimum form of output voltage is produced at the terminals 84. In practice the plain series connection of the the two windings 29 and 48 is sufficient in most cases. In that case of simple superposition by series connection, the signal between the terminals 34 and 55 is supplied to the speed control of the tape or disk playback drive, which control may be constituted as shown in connection with FIG. 9 of my aforesaid U.S. Pat. No. 4,174,484.

It is evident from FIG. 3 that exactly the same result would be obtained if two separate tachogenerators were used having mutually mirror image configurations and driven by a common drive. For example, the tachogenerator of FIG. 3 could be split along its midplane, thus along the line V and the two halves driven the same way. If the two halves are not separated from each other by too great a spacing, the same results would be obtained except merely that the useful voltage might be somewhat smaller because of the somewhat reduced useful magnetic flux density.

In the arrangement of FIG. 1 it should further be noted that the first magnetic circuit proceeds from the ring magnet 32, across the radial air gap 69, through the toothed disk 37, across the axial air gap 67, through the sections 27 and 26 and the rim 25 of the shaped piece 24 and back to the ring magnet 32, thus encircling the first winding 29. The second magnetic circuit proceeds from the ring magnet 32, across the radial air gap 69, through the toothed disk 37, across the air gap 68, through the shell shaped part 21 (particularly its ribs 19), across the air gap 85 between the portion of the part 21 parallel to the axis of rotation of the rotor and the rim 25 of the part 24, through the latter and back to the ring magnet 32. The air gap 85 should naturally be small.

Instead of the ring magnet 32 an electromagnet could be used as the source of magnetomotive force, but the use of a permanent magnet is preferred.

In summary it is pointed out that in a tachogenerator configuration according to the invention two neighboring similar windings of opposite winding sense are excited with a synchronous but oppositely phased useful flux and only by such an opposed phase excitation is a useful signal generated, so that co-phased excitation of both windings by stray fields can generate practically no output voltage.

Although the invention has been described with reference to a particular illustrative embodiment representing a preferred mode of practicing the invention, it is evident that variations and modifications may be made within the inventive concept. Thus, for example, the toothed magnetic path element represented in the illustrated embodiment by the outer edge of the rotor disk 37 could in another embodiment be outside the rotor and inwardly toothed, while the ring magnet, instead of being stationary, could be mounted on the rotor and located inside the toothed magnetic path element across a small air gap therefrom.

I claim:

1. A tachogenerator having two toroidal magnetic circuits and a rotor forming part of both said magnetic circuits, each of said magnetic circuits passing through said rotor, having a source of magnetic flux and having an individual winding for pick up of induced current, the configurations of the source of magnetic flux, rotor and winding of each circuit being such as to induce current in the winding of each magnetic circuit which is of a frequency dependent on the rotational speed of the rotor, the frequency being the same for the currents induced in both windings, said windings being so wound that induced currents of said frequency in one winding are spatially in phase opposition to those in the other winding and so connected that the said currents of said frequency reinforce each other, while electromotive forces in said windings induced by alternating stray magnetic flux passing through the tachogenerator compensate each other so as to inhibit the inducing of disturbing current.

2. A tachogenerator as defined in claim 1 in which said common source of magnetic flux is a permanent magnet.

3. A tachogenerator as defined in claim 2 in which said permanent magnet is an annular magnet (32) of alternating multi-polar magnetization, said magnetic circuits being further provided with a common magnetic path element having a toothed configuration such that the alternating recesses and projections of said toothed configuration correspond in number to the alternating poles of said magnet, said magnet and said toothed element being so relatively disposed that upon relative rotation of said magnet and element a useful alternating flux (70) is produced, one part of which encircles in one sense the winding of said one magnetic circuit and another part of which encircles in an opposite sense the winding of the other of said magnetic circuits.

4. A tachogenerator as defined in claim 3 in which said annular magnet (32) is stationary and is magnetized particularly on its inner side and is mounted on the radially inner side of the rim (25) of a first stationary magnetic return path member (24), and in which tachogenerator, further, said toothed magnetic path element (37) is the peripheral portion of said rotor providing teeth (38) on the periphery of the rotor, and in which tachogenerator, further, an inwardly extending portion (27) of said first stationary return path member (24) completes a first one of said magnetic circuits that toroidally surrounds the winding of said first magnetic circuit, which is constituted in the form of a coil coaxial with said rotor, and in which tachogenerator, further, a second stationary return path member (21) is provided on the opposite side of said toothed magnetic path element (37) from said first return magnetic path member (24) which forms with said toothed magnetic path element (37) the second of said magnetic circuits, which toroidally surrounds said winding (48) of said second magnetic circuit which is constituted as a coil coaxial with said rotor.

5. A tachogenerator as defined in claim 4 in which said second stationary return path member (21) carries an axial bearing (14) for a shaft (13) on which said rotor (37) is mounted for rotation therewith.

6. A tachogenerator as defined in claim 5 in which said second stationary return path member (21) is constituted as a bearing cover and bearing carrier for said axial bearing (14) and said shaft (13) is constituted as the shaft of a flat air gap electric motor (10) for the speed measurement of which the tachogenerator serves.

7. A tachogenerator as defined in claim 4 in which at least one of said first and second return path members (24, 21) at a section disposed radially inside of said permanent magnet (32)
is spaced by a small air gap (67, 68) from a portion of said rotor (37).

8. A tachogenerator as defined in claim 4 in which said second stationary return path member (21) externally overlaps the rim (25) of said first stationary magnetic return path member (24).

9. A tachogenerator as defined in claim 1 in which said magnetic circuit has a common rotor (37) and a common source of magnetic flux (32).

10. A tachogenerator as defined in claim 9 in which both of said windings (29, 48) are constituted so as to be intersected substantially identically by alternating stray fluxes.

11. A tachogenerator as defined in claim 9 in which said respective windings (29, 48) comprise coils (31, 50) connected in series and of opposite winding direction with reference to their common connection.

12. A tachogenerator as defined in any one of claims 1–11 having its rotor mounted on the same shaft (13) as the rotor of a brushless dc motor (10) and its stationary portion connected to the stationary structure of said brushless dc motor (10).

13. A tachogenerator as defined in any one of claims 1–8 having its rotor mounted on the same shaft (13) as the rotor of a brushless dc motor (10) and its stationary portion connected to the stationary structure of said brushless dc motor (10), said motor having a stationary magnetic return plate (70) on which said stationary portion of said tachogenerator (20) is fastened.

14. A tachogenerator as defined in any one of claims 5–8 having its rotor mounted on the same shaft (13) as the rotor of a brushless dc motor (10) and its stationary portion connected to the stationary structure of said brushless dc motor (10), in which said stationary portion of said tachogenerator carries an axial bearing (14) for said shaft (13) on one of its magnetic return path members (21).

15. A tachogenerator having a first winding toroidally encircled by a first magnetic circuit which latter comprises a rotor (37) and a source of magnetic flux so as to produce in operation variations of magnetic flux (32) in said first magnetic circuit and to induce in said first winding a first alternating voltage having a frequency dependent on the rotational speed of said rotor, further having, in spatial proximity to said first magnetic circuit, a second winding toroidally encircled by a second magnetic circuit, the latter also comprising said rotor (37) and said source of magnetic flux (32) so as to produce in operation variations of magnetic flux in said second magnetic circuit having the same frequency as the flux variations in said first magnetic circuit but being oppositely directed, i.e. oppositely phased, with respect thereto, so as to induce a second alternating voltage in said second winding having the same frequency as that induced in the first winding, and means for additively superimposing said first and said second alternating voltages, whereby voltages induced by stray fluxes in said first and second windings are substantially cancelled out.

16. A tachogenerator as defined in claim 15 in which said first and second windings (29 and 48) are substantially identical in shape and are arranged substantially concentrical with each other.

* * * * *